United States Patent

Stanton et al.

[11] Patent Number: 5,274,822
[45] Date of Patent: Dec. 28, 1993

[54] FAST CENTRALIZED ARBITRATOR

[75] Inventors: Richard L. Stanton, Central; Kenneth J. Kotlowski, Greenville, both of S.C.

[73] Assignee: NCR Corporation, Dayton, Ohio

[21] Appl. No.: 547,352

[22] Filed: Jul. 2, 1990

[51] Int. Cl.⁵ .................................. G06F 13/14
[52] U.S. Cl. .................. 395/725; 364/DIG. 1; 364/242.6; 364/242.8; 364/242.9; 364/259.1; 364/259.9
[58] Field of Search ................ 395/325, 725

[56] References Cited

U.S. PATENT DOCUMENTS

| | | | |
|---|---|---|---|
| 4,229,791 | 10/1980 | Levy et al. | 395/325 |
| 4,257,095 | 3/1981 | Nadir | 395/325 |
| 4,402,040 | 8/1983 | Evett | 395/325 |
| 4,499,538 | 2/1985 | Finger et al. | 395/325 |
| 4,535,330 | 8/1985 | Carey et al. | 395/325 |
| 4,620,278 | 10/1986 | Ellsworth et al. | 395/325 |
| 4,628,447 | 12/1986 | Cartret et al. | 395/725 |
| 4,814,974 | 3/1989 | Narayanan et al. | 395/725 |
| 4,979,100 | 12/1990 | Makris et al. | 395/325 |

*Primary Examiner*—Debra A. Chun
*Attorney, Agent, or Firm*—James M. Stover

[57] ABSTRACT

A fast centralized arbitrator for avoiding contention between up to eight processors or other smart devices having access to a shared computer facility. Each of the processors or smart devices is assigned a unique three digit octal formatted priority level. A first set of 1-of-8 decoders, AND gates and a prioritizer circuit are employed to determine the priority level of the highest priority device requesting access to the shared facility. A second set of 1-of-8 decoders, each having associated therewith a set of OR gates for combining the decoder outputs with the outputs of the prioritizer circuit and an AND gate for combining the outputs of the set of OR gates, are employed to generate a set of acknowledge signals for the smart devices.

6 Claims, 17 Drawing Sheets

| FIG. 2A | FIG. 2B | FIG. 2C |         |
|---------|---------|---------|---------|
| FIG. 2D | FIG. 2E | FIG. 2F | FIG. 2G |
| FIG. 2H | FIG. 2I | FIG. 2J | FIG. 2K |
| FIG. 2L | FIG. 2M | FIG. 2N | FIG. 2O |

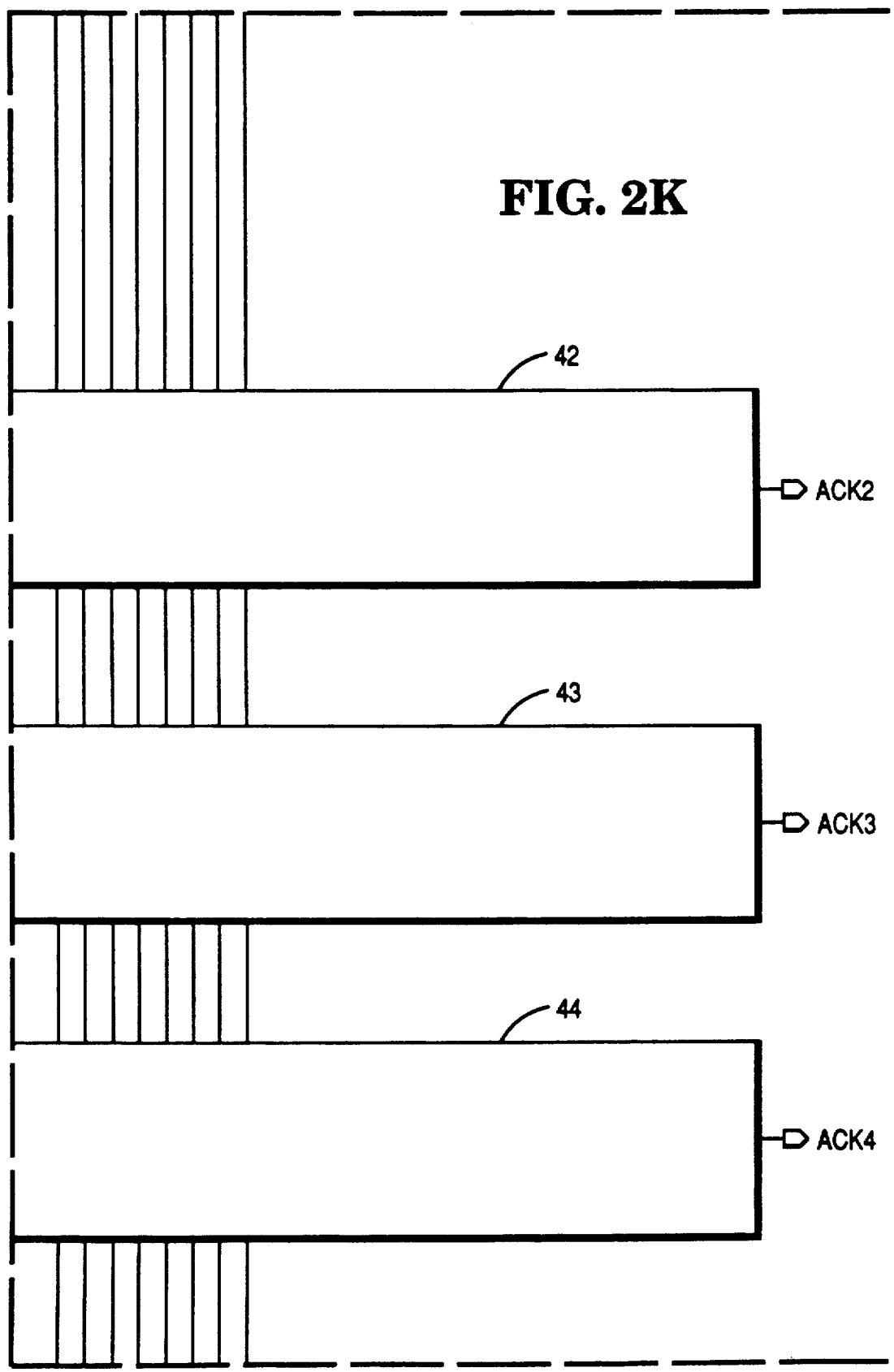

FAST CENTRALIZED ARBITRATOR

The present invention relates to an arbitration system for establishing priority among multiple computer devices having access to a shared facility.

BACKGROUND OF THE INVENTION

In recent years, computer systems are increasingly being designed with multiple processors and other "smart" devices sharing access to common facilities such as data busses or memory devices. This trend is due in part to the development of smaller, less expensive yet more powerful processing circuits. The advantage of a system design in which processors and other smart devices share a data bus is that the system can be designed with fewer lines, which saves space and, usually, cost. In addition, operating the processor and other smart devices in parallel increases the computational power and speed of a computer system.

The advantages stated above are not confined to large multi-processor computer systems. The desire to increase the speed and computational power of personal computers has led to PC architecture designs in which the processor and other smart devices are operated in parallel.

However, since two or more device can not successfully transmit over a bus at one time or concurrently make use of other shared facilities, some method of arbitration is required. Although numerous arbitration systems are disclosed in the prior art, the present invention provides a simple and inexpensive circuit for quickly arbitrating between multiple devices. The circuit has primary applicability to use in personal computers.

OBJECTS OF THE INVENTION

It is therefore an object of the present invention to provide a new and useful arbitration circuit for avoiding contention between two or more processors or other smart devices having access to a shared facility.

It is another object of the present invention to provide such a circuit for arbitrating between up to eight smart devices sharing access to a common data bus within a personal computer.

It is yet another object of the present invention to provide an arbitration system implemented in hardware for providing fast resolution of contention between up to eight smart devices sharing access to a common data bus within a personal computer.

It is still a further object of the present invention to provide an arbitration system implemented in hardware for avoiding contention between a plurality of smart devices having access to a shared facility which permits easy assignment and reassignment of priority levels for the smart devices.

SUMMARY OF THE INVENTION

There is provided, in accordance with the present invention, an arbitration circuit for avoiding contention between a plurality of devices coupled for access to a shared computer facility, such as a shared memory. The arbitration circuit includes first means which, upon the receipt of request signals and priority level signals from one or more of the devices, determines the priority level of the highest priority device requesting access to the shared facility. An acknowledge signal informing the appropriate device that it may access the shared facility is generated by second means which compares the output of the first means to the priority levels of each one of the plurality of devices.

In the described embodiment, an arbitration circuit for arbitrating between seven processors or other smart devices having access to a shared facility is disclosed. The priority levels assigned to each of the devices are stored in octal format and can range in value 0 to 7. Associated with each of the seven processors is a 1-of-8, decoder which is connected to receive the octal formatted priority level for the device and an active LOW request signal from the device. Each decoder has eight normally HIGH outputs corresponding to the eight possible octal combinations which could be received. Upon receipt of a LOW request signal the output corresponding to the octal formatted priority level for the associated device is set LOW.

The corresponding outputs of the seven decoders are combined together by eight AND gates, the outputs of which are provided to a prioritizer circuit. The prioritizer circuit also includes eight outputs which correspond to the eight possible priority levels. Only one of the prioritizer outputs, that output which corresponds to the priority level of the highest priority device requesting access to the shared facility, will be set LOW.

Also associated with each device is a second decoder, a set of eight OR gates and an AND gate. The eight prioritizer outputs are provided to each of the seven sets of OR gates for combination with corresponding outputs of the second group of decoders. The outputs of each set of OR gates are provided to their associated AND gate for generation of an active LOW acknowledge signal for the associated processor or smart device.

The above and other objects, features, and advantages of the present invention will become apparent from the following description when read in conjunction with the attached drawings in which applicable reference numerals have been carried forward.

BRIEF DESCRIPTION OF THE DRAWINGS

FIGS. 2 and 2A through 20 are detailed schematic diagrams of the arbitrator circuit shown in FIG. 1.

FIG. 3 is a schematic diagram of the 1-of-8 decoder shown in FIGS. 1 and 2.

DETAILED DESCRIPTION OF THE PREFERRED EMBODIMENT

Figure 1:
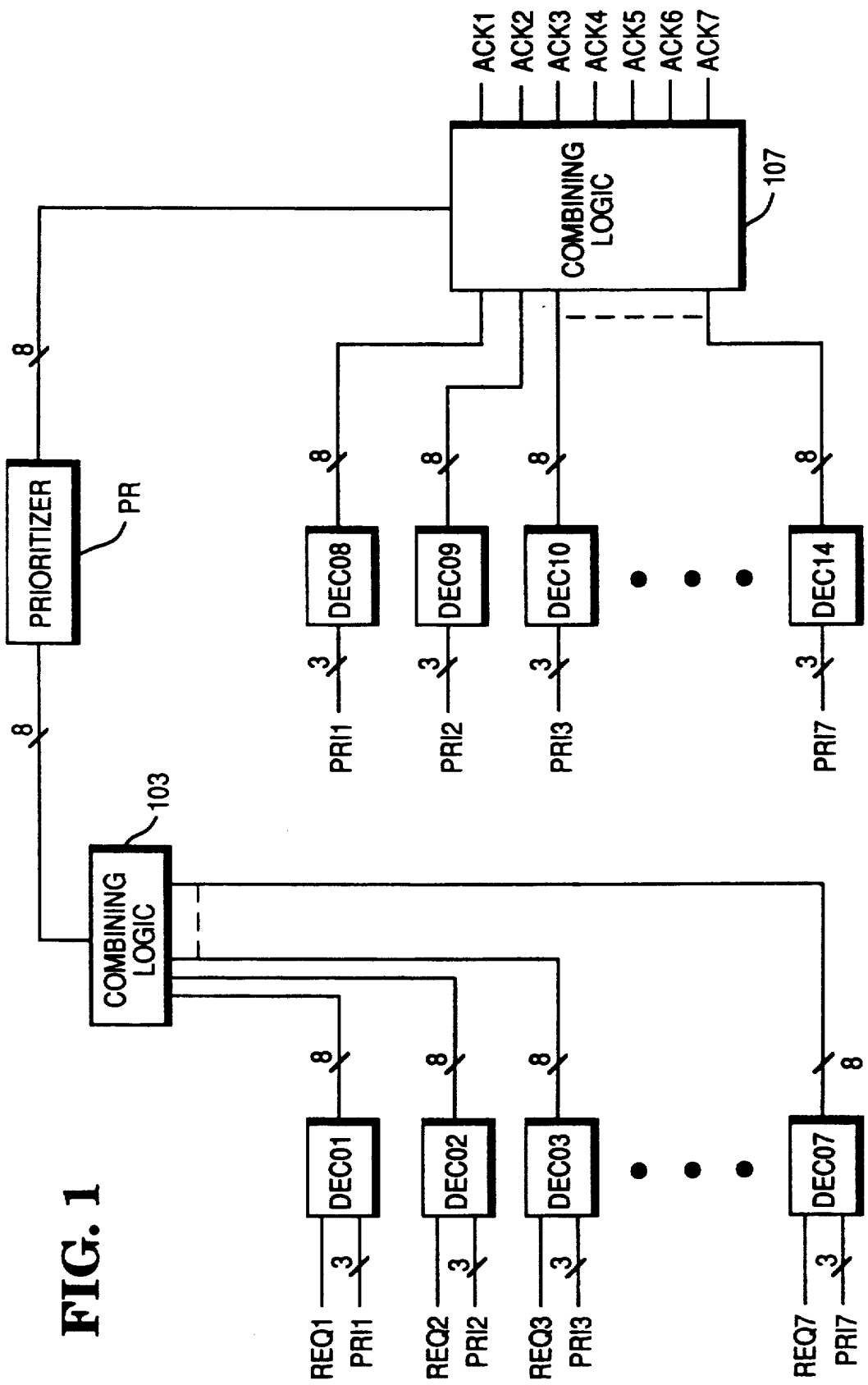
FIG. 1 is a block diagram of an arbitration circuit in accordance with the present invention.

Referring now to FIG. 1, there is seen a block diagram of a circuit for for arbitrating between up to seven processors or other smart devices, hereinafter also referred to as bus masters, having access to a common data bus. The arbitration circuit includes fourteen 1-of-eight decoders labeled DEC01 through DEC14, although only DEC01 through DEC03, DEC07 through DEC11 and DEC14 are shown. Each of decoders DEC01 through DEC07 receives from an associated smart device a respective one of enable signals EN1 through EN7 and a respective one of three-bit priority signals PRI1 through PRI7. Decoders DEC08 through DEC14 are also connected to receive signals PRI1 through PRI7, respectively.

The eight-bit outputs of decoders DEC01 through DEC07 are provided to combining logic 103. Logic 103 combines the corresponding outputs of the decoders to generate an eight-bit output which includes priority information from each enabled decoder. A prioritizer PR receives the output of combining logic 103 and generates an eight-bit output which only includes priority information from the enabled decoder associated with the highest priority smart device requesting access to the common data bus.

Comparing logic 107 compares the output of priorizer PR with the outputs of decoders DEC08 through DEC14 to generate an acknowledge signal for the highest priority device requesting access to the common data bus. A detailed description of the construction and operation of the arbitration circuit is provided below.

Figures 2, 2A:
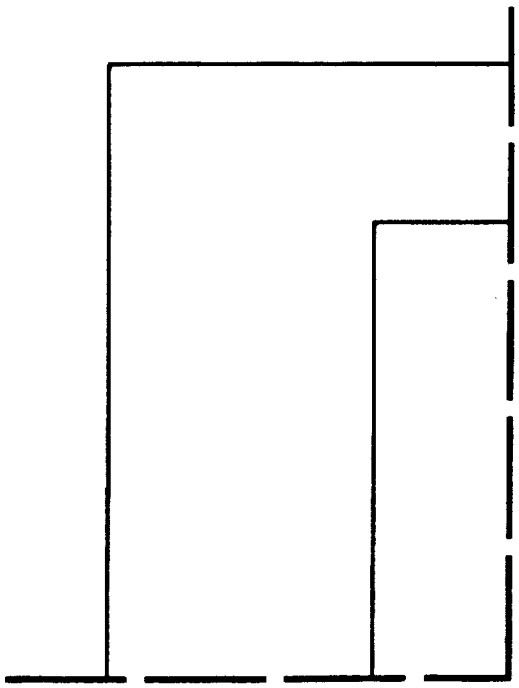
Figure 2B:
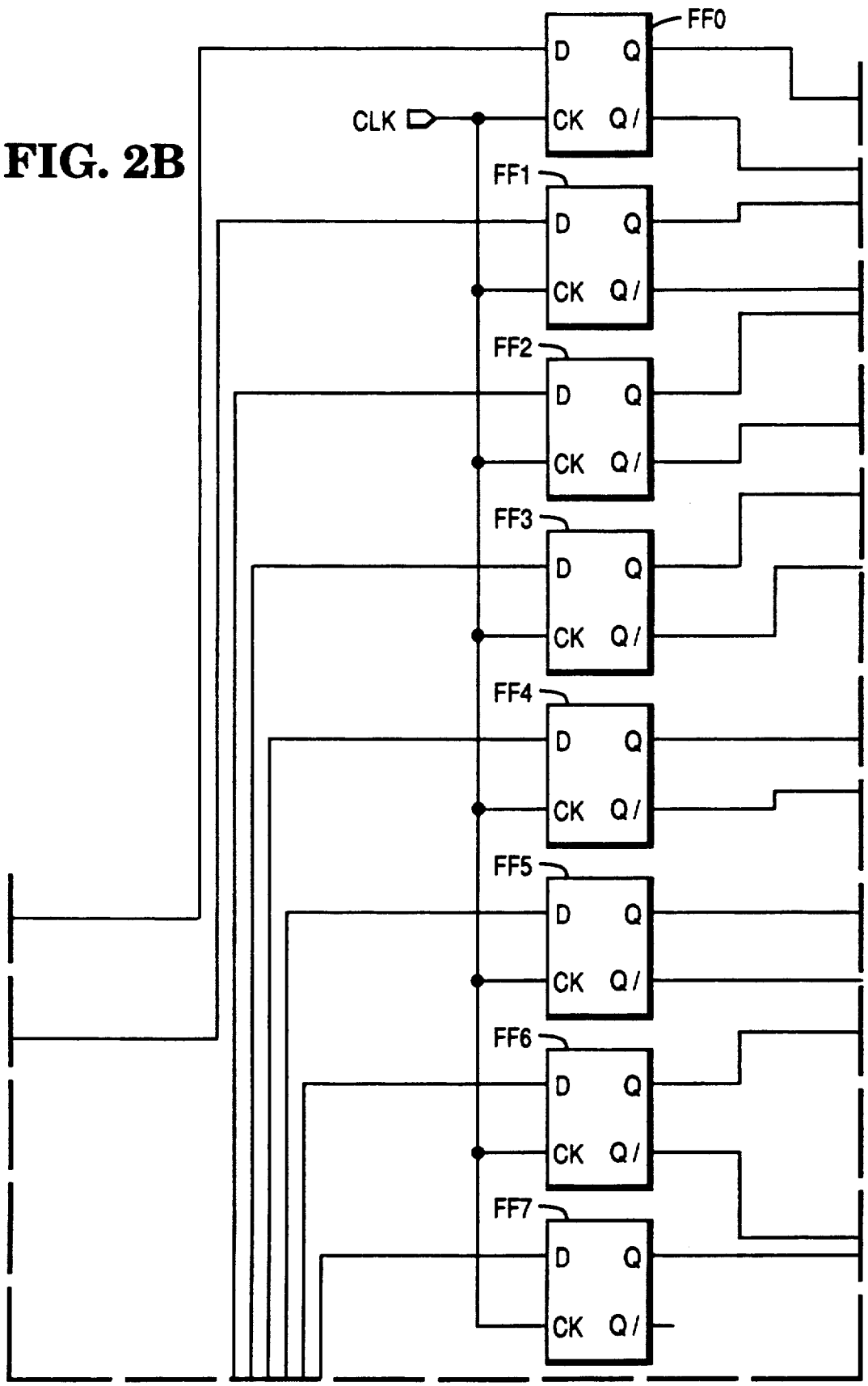
Figure 2C:
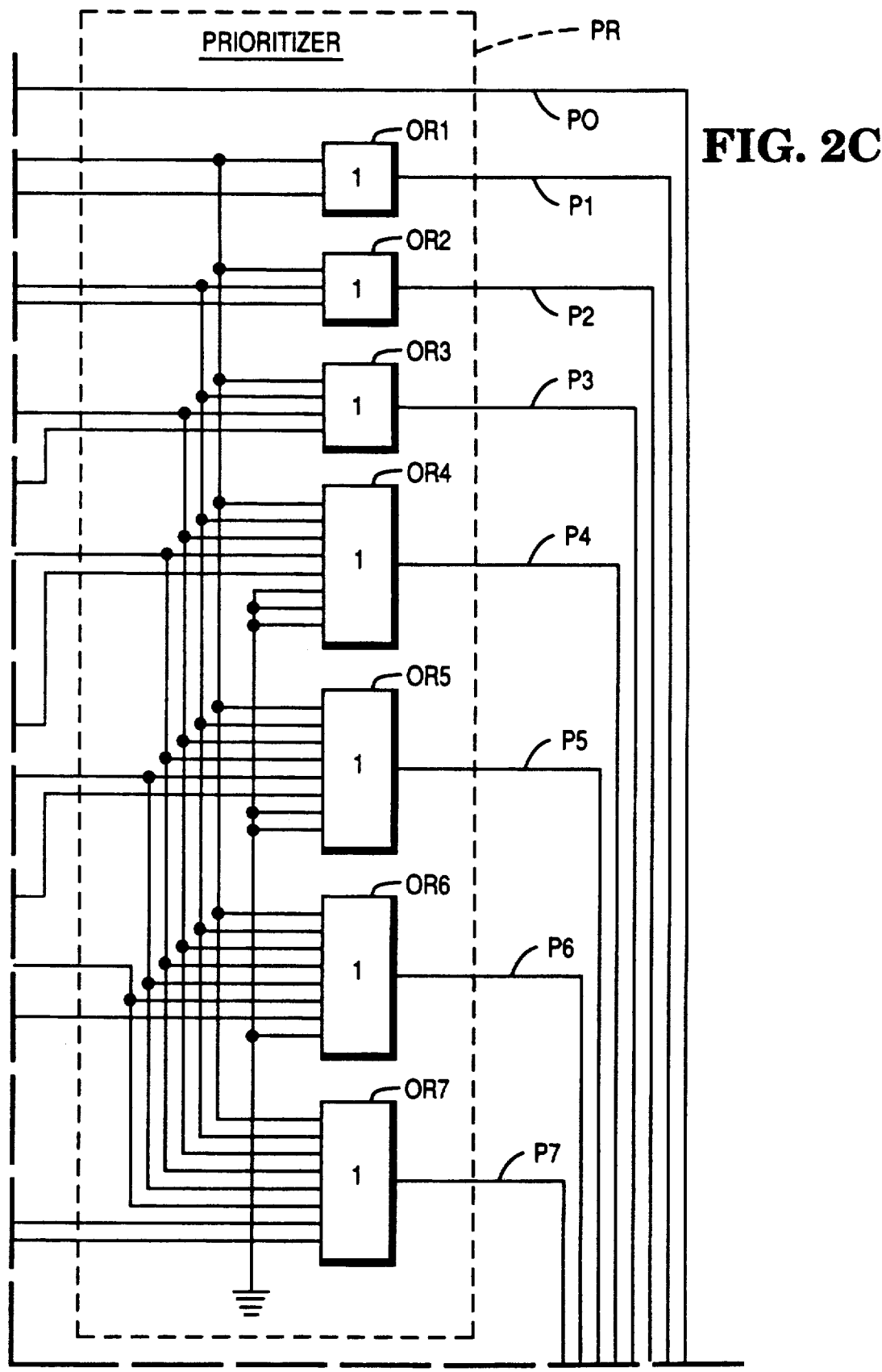
Figure 2D:
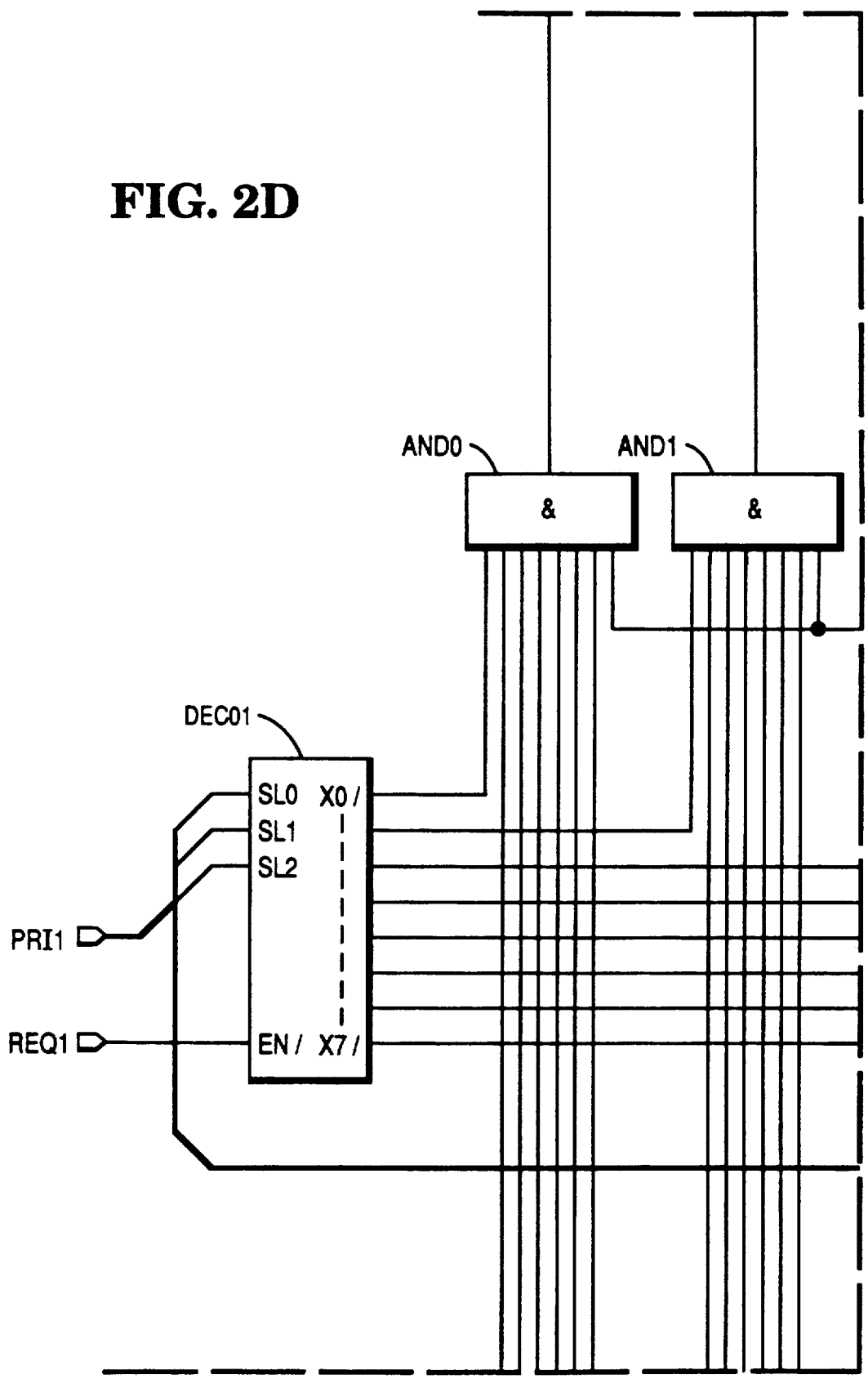
Figure 2E:
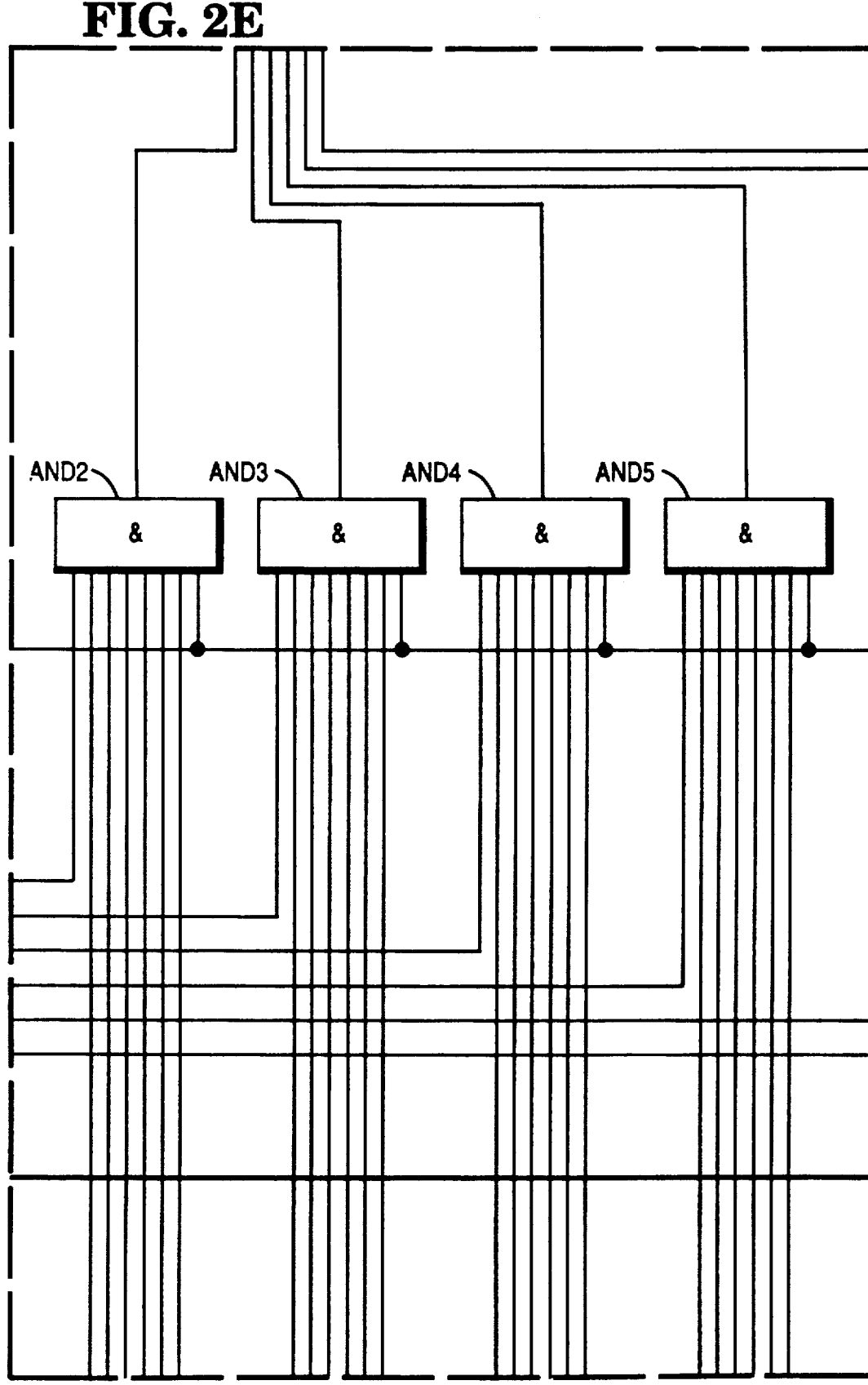
Figure 2F:
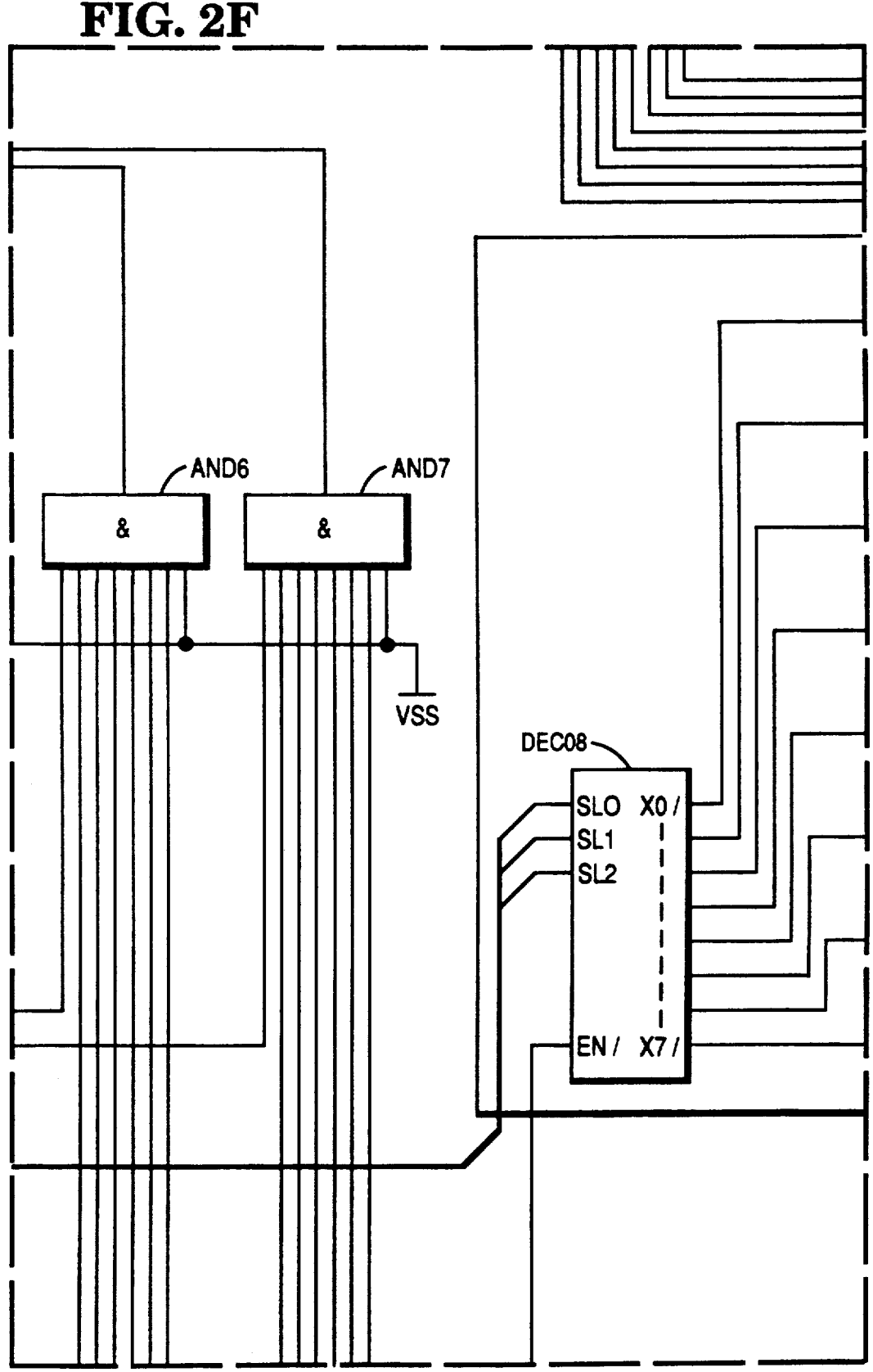
Figure 2G:
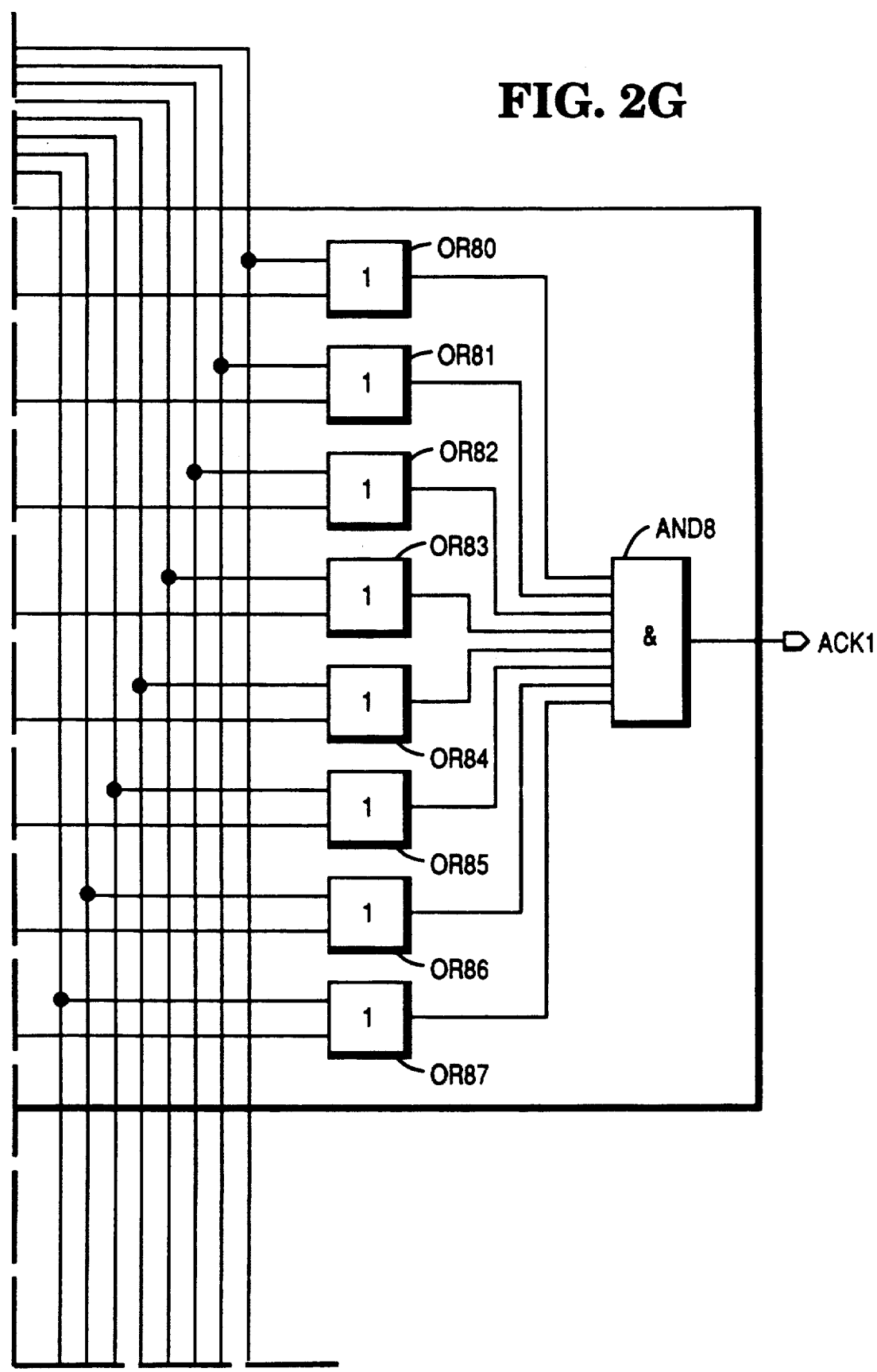
Figure 2H:
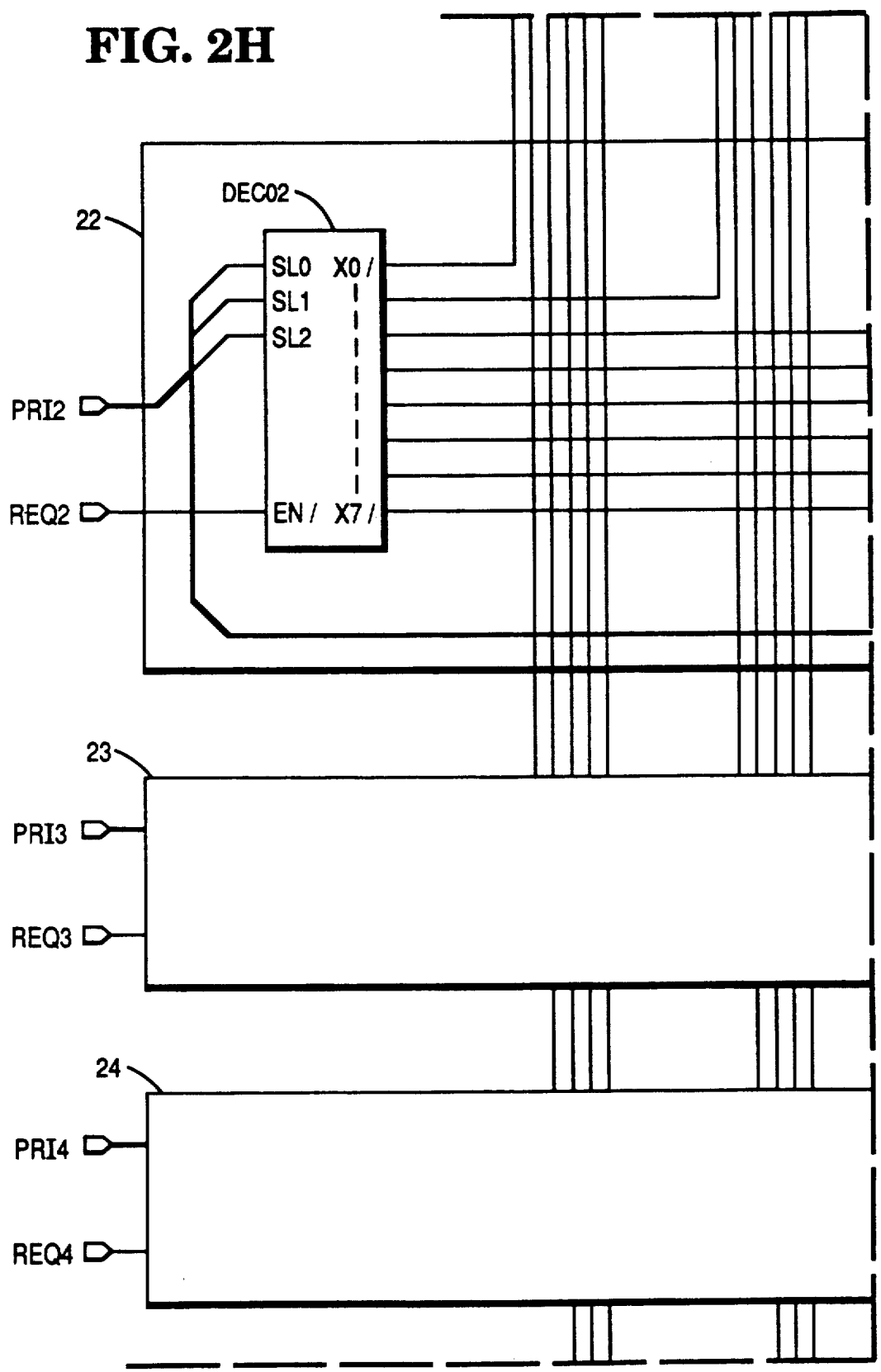
Figure 2I:
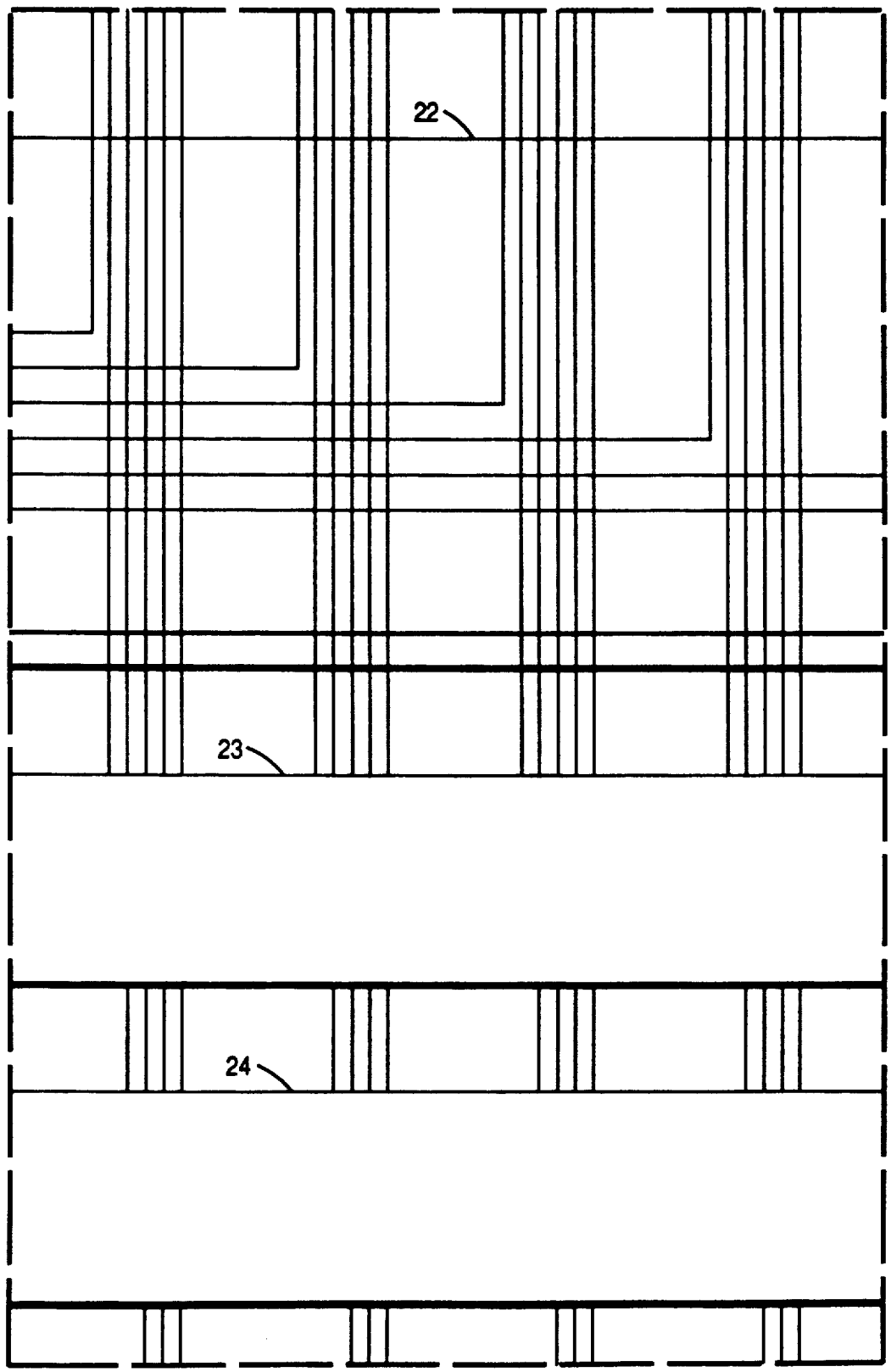
Figure 2J:
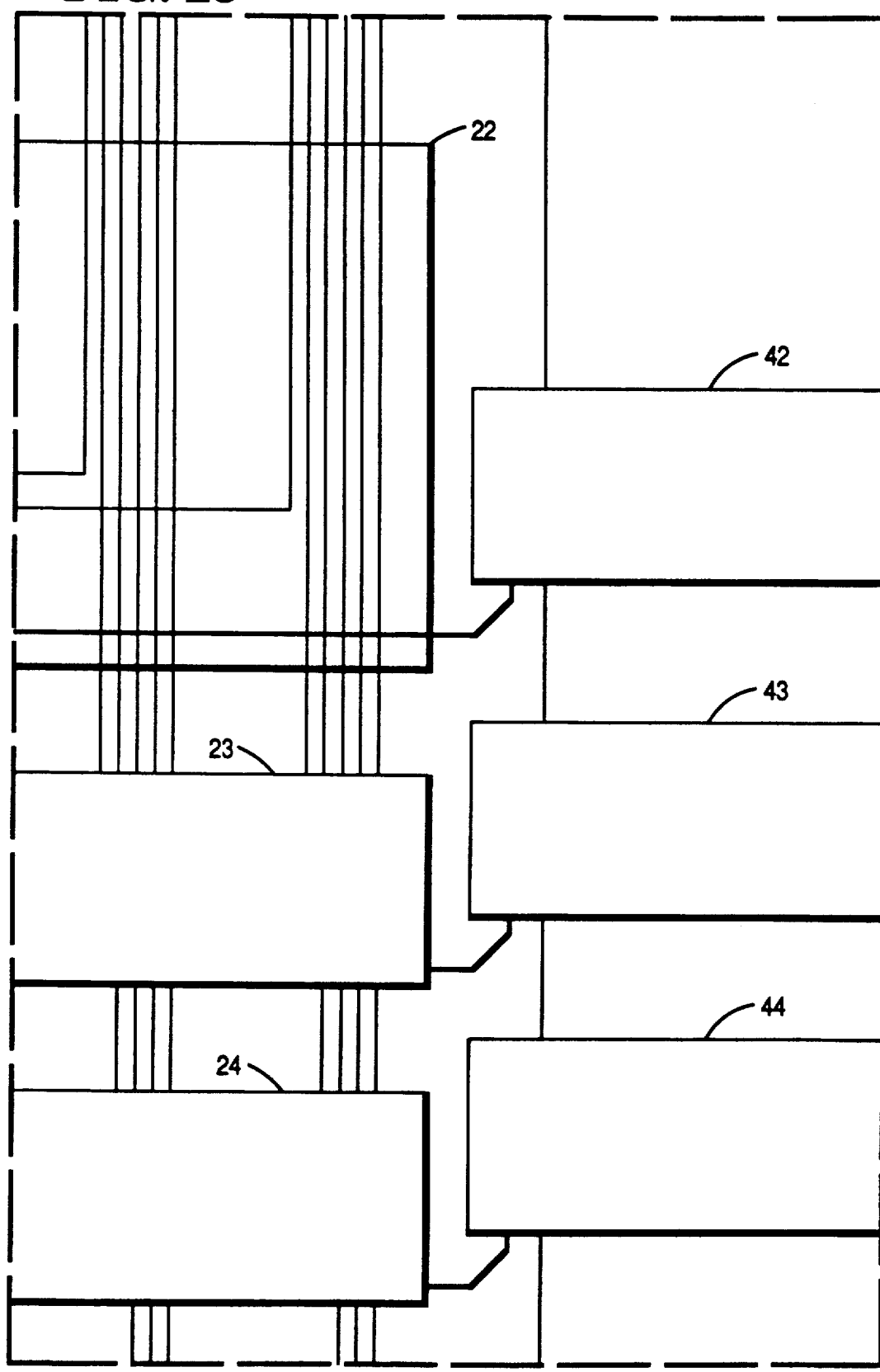
Figure 2L:
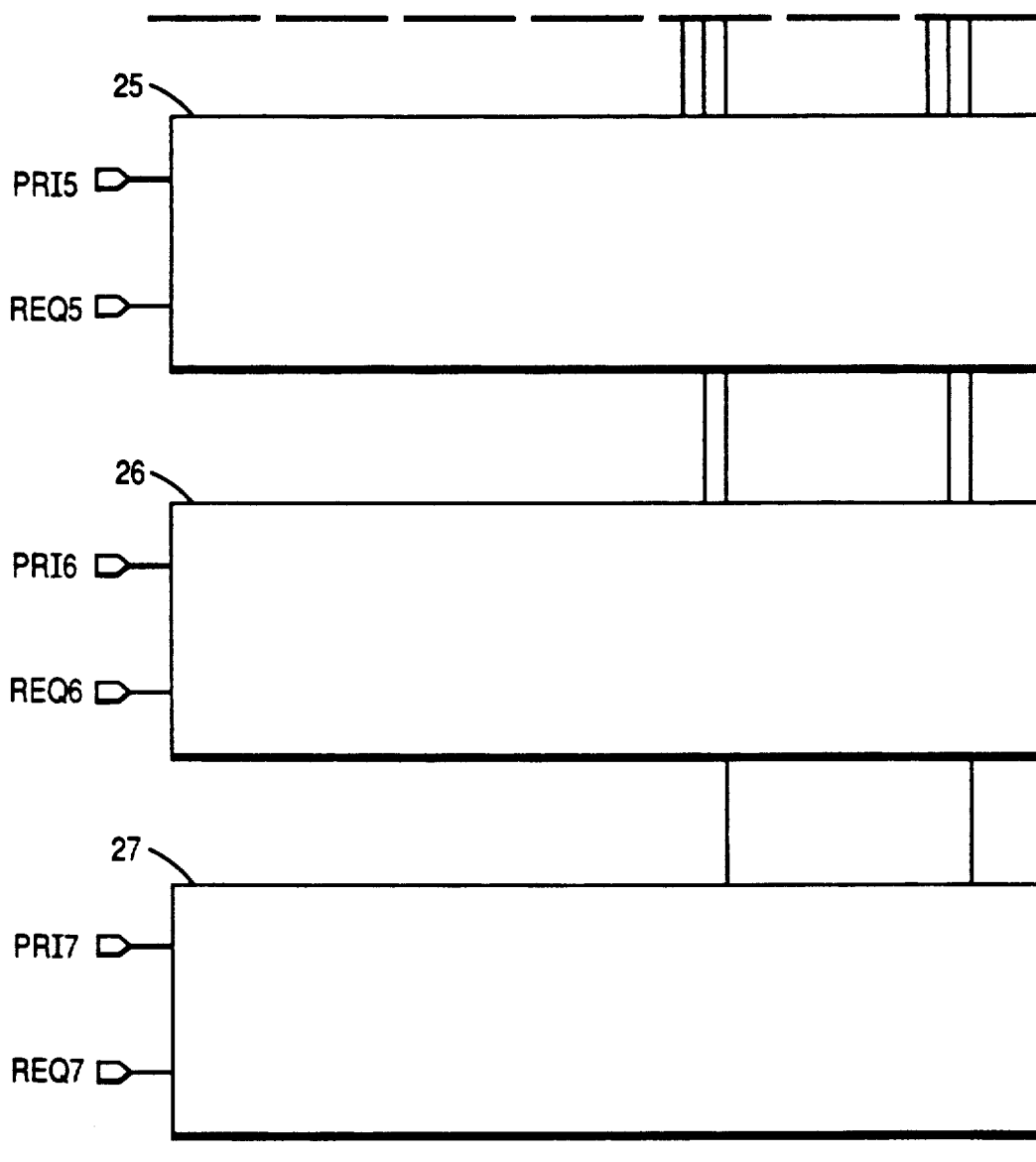
Figure 2M:
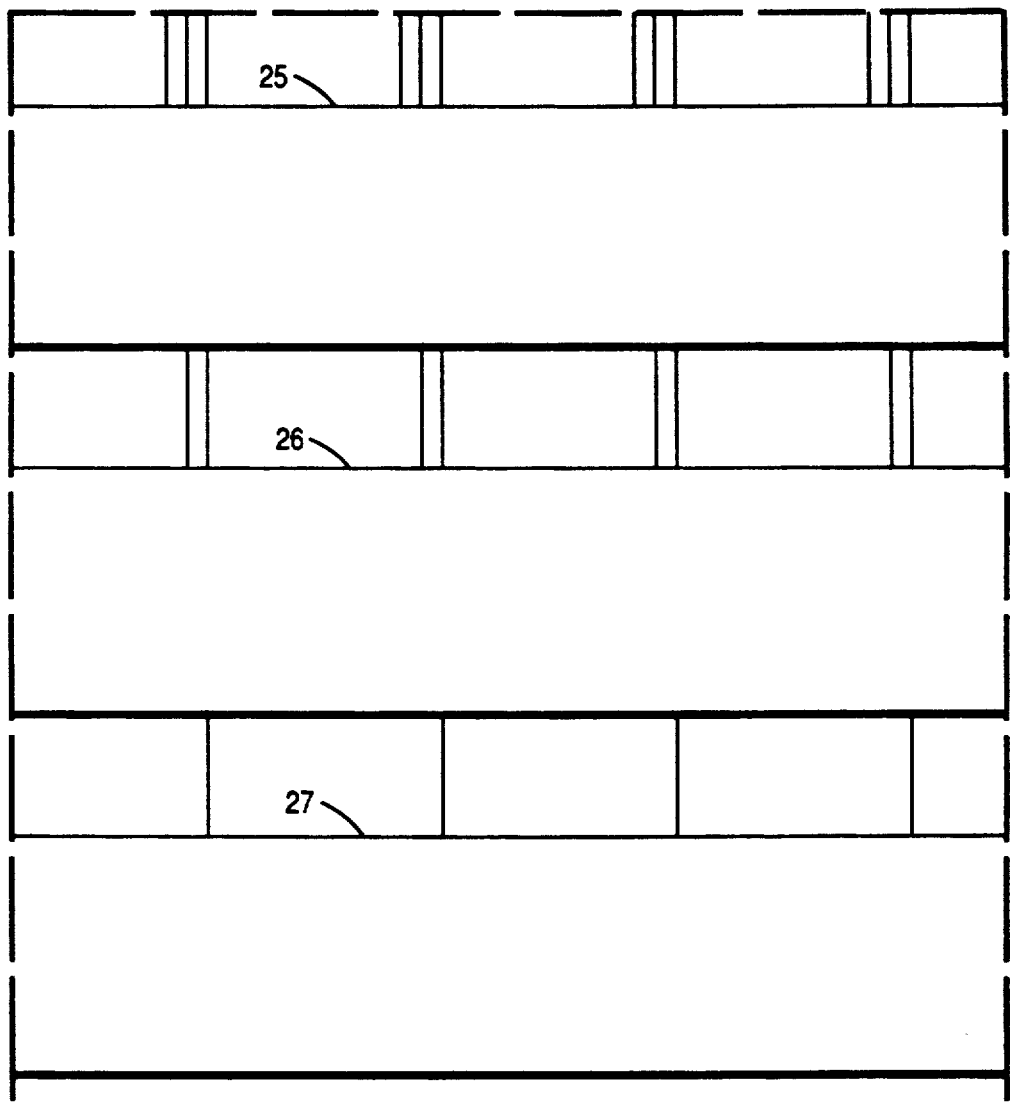
Figure 2N:
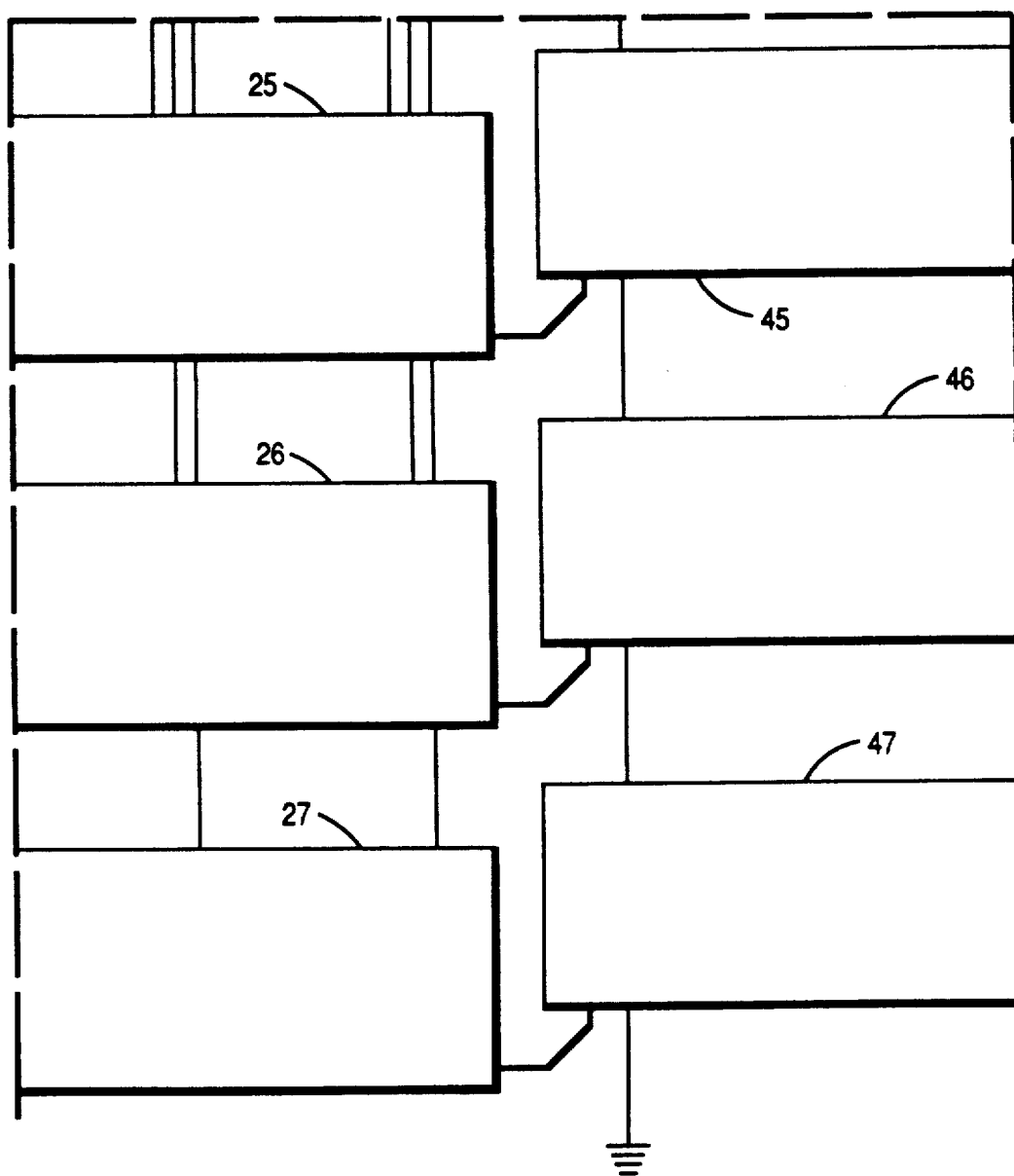
Figure 20:
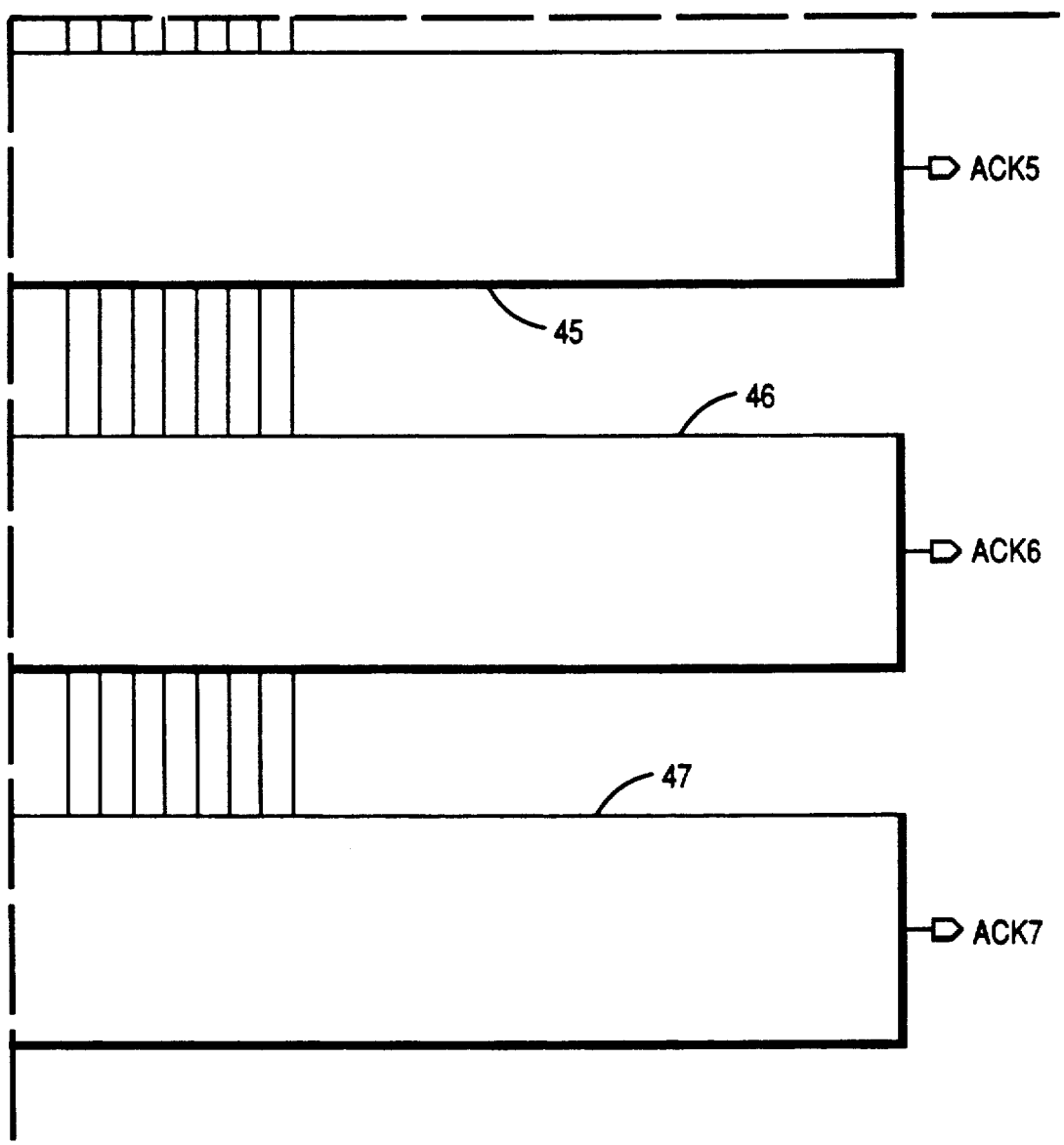

FIG. 2 is a detailed schematic diagram of the arbitration circuit shown in FIG. 1. However, to simplify the drawing only decoders DEC01, DEC02 and DEC08 and their associated circuitry are shown in detail. Each of boxes 23 through 27 includes structure equivalent to that shown in box 22, and each of boxes 42 through 47 includes structure equivalent to that shown in box 41.

Figure 3:
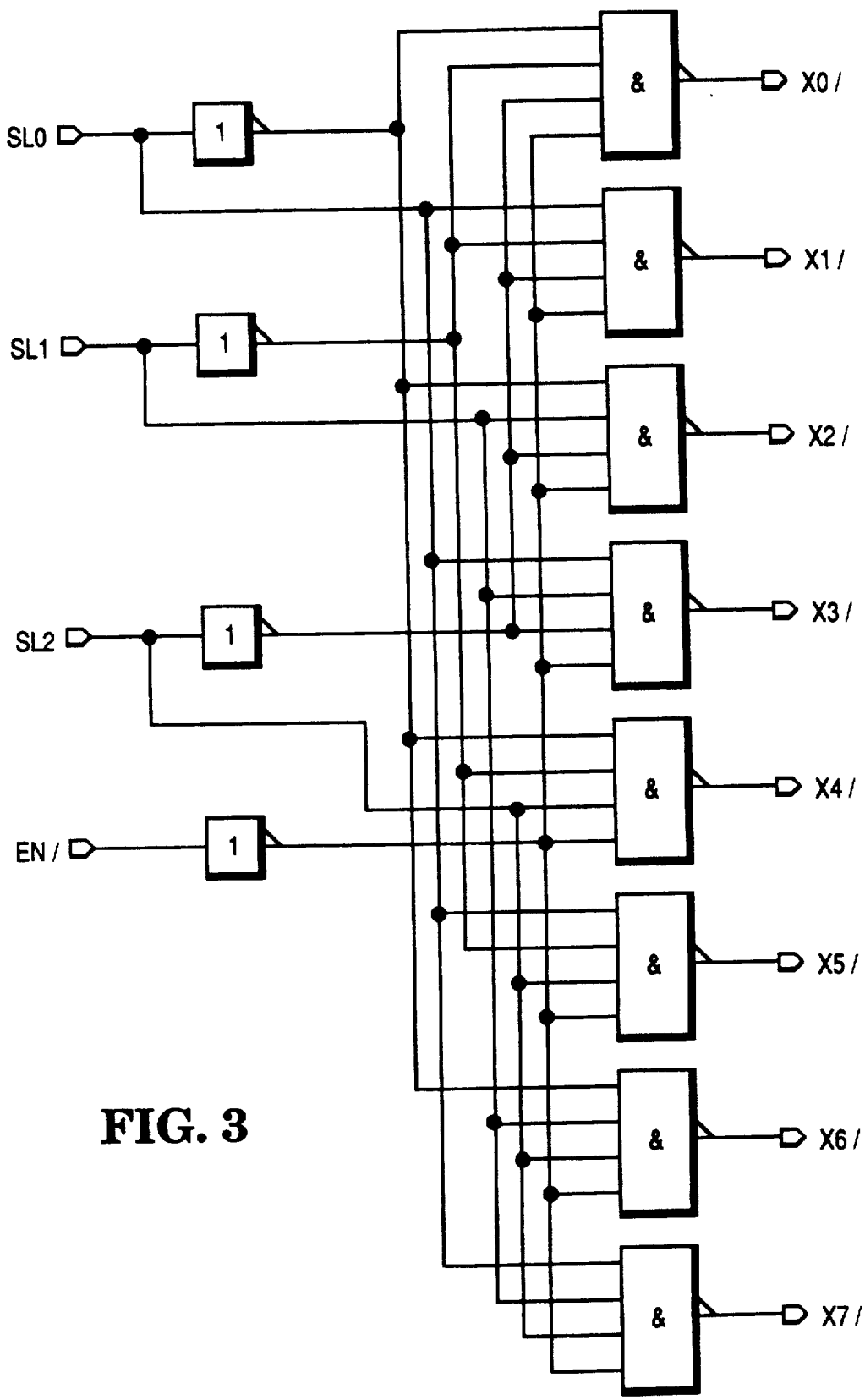

Each decoder has three input terminals designated SL0, SL1, SL2 for receiving octal data, an enable input terminal EN/, and eight output terminals identified as X0/ through X7/. The function of each decoder is to supply one output for each octal input received at terminals SL0 through SL2. One possible construction for a three-bit 1-of-8 decoder is shown in FIG. 3, operation of which can be readily understood. For the decoder implementation shown in the Figures, outputs X0/ through X7/ are normally HIGH. Upon receipt of an octal signal on inputs SL0–SL2, and a LOW signal at input EN/, the decoder will set the output corresponding to the received octal value to a LOW state.

Each one of decoders DEC01 through DEC07 corresponds to a separate processor or other smart device (not shown) and is connected to receive at its EN/ input a request signal from its corresponding smart device. The request signals provided to decoders DEC01 through DEC07 are designated REQ1 through REQ7, respectively. The EN/ input terminals of decoders DEC08 through DEC14 are connected to receive a LOW signal thereby placing the decoders in a continually enabled state.

Decoders DEC01 through DEC14 are also connected to each receive a three-bit octal priority level signal from one or more storage registers, not shown. Decoders DEC01 and DEC08 receive a three-bit octal signal PRI1 associated with the first bus master at their SL0–SL2 inputs. Similarly, signals PRI2, PRI3, PRI4, PRI5, PRI6 and PRI7 are respectively provided to the following pairs of decoders: DEC02 and DEC09, DEC03 and DEC10, DEC04 and DEC11, DEC05 and DEC12, DEC06 and DEC13, and DEC07 and DEC14.

The X0/ outputs of decoders DEC01 through DEC07 are provided to separate inputs of an eight-input AND gate AND0. In like fashion, seven additional eight-input AND gates, labeled AND1 through AND7, are connected to receive the X1/ through X7/ outputs, respectively, from decoders DEC01 through DEC07. The output of each AND gate is provided through a respective one of flip-flops FF0 through FF7 to prioritizer circuit PR. Gates AND0 through AND7 form the combining logic shown in FIG. 1.

The prioritizer circuit includes a two-input OR gate OR1, a three-input OR gate OR2, a four-input OR gate OR3, and four eight-input OR gates OR4 through OR7. The Q output of each one of flip-flops FF1 through FF7 is provided to a respective one of OR gates OR1 through OR7. In addition, OR gates OR1 through OR7 receive the Q/ output of flip-flop FF0, gates OR2 through OR7 each receive the Q/ output of flip-flop FF1, gates OR3 through OR7 each receive the Q/ output of flip-flop FF2, gates OR4 through OR7 receive the Q/ output from flip-flop FF3, OR gates OR5 through OR7 are connected to receive the Q/ output of FF4, the Q/ output of FF5 is provided to gates OR6 and OR7, and the Q/ output of FF6 is provided to OR7. The remaining inputs of gates OR4 through OR7 are connected to receive a LOW signal.

Eight outputs, designated P0 through P7, are provided by the prioritizer circuit. Output P0 is equivalent to the Q output of flip-flop FF0. The remaining outputs correspond to the outputs of gates OR1 through OR7.

Associated with each one of decoders DEC08 through DEC14 are eight two-input OR gates, the outputs of which are provided to an eight-input AND gate. For decoder DEC08 the associated OR gates are labeled OR80 through OR88 and the AND gate is identified as AND8. Gates OR80 through OR88 are connected to receive decoder DEC08 outputs X0/ through X8/ and prioritizer outputs P0 through P8, respectively. The output signal generated by AND gate AND8, hereinafter referred to as acknowledge signal ACK1, is provided to the bus master associated with decoder DEC01. The remaining decoders and their associated gates are similarly connected. Although not shown, the gates associated with the output of decoders DEC09 through DEC14 are identified in the same manner as the gates following DEC08. For example, the gates associated with DEC09 are designated OR90 through OR97 and AND9 and the gates associated with DEC10 are identified as OR100 through OR107 and AND10. Acknowledge signals ACK2 through ACK8, generated by AND gates AND9 through AND14, are provided back to the bus masters associated with decoders DEC02 through DEC07, respectively. Gates OR80 through OR140 and AND8 through AND14 form the comparing logic shown in FIG. 1.

In operation, priority levels ranging from zero to seven are assigned to the bus masters connected to the arbitration circuit, the highest priority level being zero and the lowest level being seven. No two bus masters are permitted to have the same priority level. The assigned priority levels are stored and held as signals PRI1 through PRI7 in octal format in a register (not shown) and maintained at the SL0–SL2 inputs of decoders DEC01 through DEC14. These assigned levels do not change during the arbitration process.

When a bus master requires access to the common data bus it generates a request signal which is provided to the arbitration circuit. Access to the bus will be postponed until an acknowledge signal, generated by the arbitration circuit, is provided by the arbitration circuit to the requesting bus master. When request signals are received from multiple bus masters concurrently the arbitration circuit will generate an acknowledge signal for the highest priority device only. A new acknowledge signal will be generated for the then-highest priority device when the data bus thereafter becomes available.

Upon receipt of request signals from the bus masters wishing to access to common data bus, an appropriate output of each one of the decoders DEC01 through DEC07 which is enabled is set LOW. Gates AND0 through AND7 combine the corresponding outputs of decoders DEC01 through DEC07 to determine the priority levels of the bus masters requesting access to the common data bus. Prioritizer PR determines the priority value of the highest priority device requesting bus access. The prioritizer outputs are gated with the outputs of decoders DEC08 through DEC14 to generate an acknowledge signal for the requesting device determined to have the highest priority.

The following example is provided to further explain the operation of the arbitration circuit. Assume for this example that the system which utilizes the arbitration device includes seven bus masters and that the first bus master, associated with decoder DEC01, has a priority level of 2 ($PRI1=010_2$, where the subscript 2 indicates a binary number), the second bus master, associated with decoder DEC02, has a priority level of 3 ($PRI2=011_2$), and the remaining bus masters have respective priority levels of 4 ($PRI3=100_2$), 5 ($PRI4=101_2$), 6 ($PRI5=110_2$), 0 ($PRI6=000_2$), and 1 ($PRI7=001_2$). In addition, the bus masters associated with decoders DEC01, DEC04 and DEC07 have simultaneously requested access to the common data bus by setting request signals REQ1, REQ4 and REQ7 to a LOW state. Signals REQ2, REQ3, REQ5 and REQ6 remain HIGH indicating that the remaining devices do not, at this time, require access to the data bus.

Upon receipt of the LOW state request signals from their associated bus masters, decoders DEC01, DEC04 and DEC07 set the outputs corresponding to the octal signals present at their SL0-SL2 inputs to a LOW state. Decoder DEC01, which receives an octal priority level signal of 2 ($010_2$) from the first bus master, sets output X2/ to a LOW state. Likewise, decoder DEC04 sets its X5/ to a LOW state and decoder DEC07 sets its X1/ output to a LOW state. The remaining outputs of decoders DEC01, DEC04 and DEC07, and all the outputs of the non-enabled decoders remain in a HIGH state.

AND gates AND0 through AND7 combine the outputs of decoders DEC01 through DEC07 to determine the priority levels of the bus masters requesting access to the common data bus. In the present example, output X2/ from DEC01, output X5/ from DEC04 and output X1/ from DEC07 are all LOW. The output of each of gates AND1, AND2 and AND5 will therefore be at a LOW state indicating that devices having priority levels of 1, 2 and 5 are requesting access to the data bus. The outputs of gates AND0, AND3, AND4, AND6 and AND7 are HIGH.

Flip-flops FF0 through FF7 provide uncomplemented and complemented versions of the outputs of gates AND0 through AND7 to prioritizer circuit PR. The prioritizer circuit passes the output signal having the highest priority and blocks transmission of all lower priority signals. The uncomplemented HIGH state output of gate AND0 is passed through to prioritizer output P0. The complemented output of gate AND0 and the uncomplemented LOW state output of gate AND1 are provided to OR gate OR1 which generates a LOW state output signal at output P1. The complemented output of gate AND1 having a HIGH state is provided to gates OR2 through OR7, thus setting outputs P2 through P7 to HIGH states. Only output P1 is set to a LOW state, indicating that the highest priority device requesting bus access has a priority level of 1.

The prioritizer outputs P0 through P7 are provided to gates OR80 through OR87, respectively, and in similar fashion to the OR gating associated with the outputs of decoders DEC09 through DEC14. Only one OR gate will have two LOW inputs and as a result thereof a LOW output. For the present example, gate OR91 associated with the X1/ output of decoder DEC09 will have a LOW output since both of its inputs, P1 from the prioritizer and X1/ form DEC09, are LOW. The remaining OR gates following DEC09 and all the OR gates associated with DEC08 and DEC10 through DEC14 will have at least one HIGH input. The output of gate AND9, i.e. signal ACK2, is set LOW by gate OR91 authorizing the bus master connected to receive ACK1 to access the common data bus.

It can thus be seen that there has been provided by the present invention a simple and inexpensive means for arbitrating between two or more processors or other smart devices.

From the foregoing specification it will be clear to those skilled in the art that the present invention is not limited to the specific embodiment described and illustrated and that numerous modifications and changes are possible without departing from the scope of the present invention. For example, the circuit as described above arbitrates between seven devices, each having a unique three-bit octal formatted priority code assigned thereto. Systems for arbitrating between more or less devices or utilizing priority codes formatted in other than three-bit octal can be constructed. In addition, the system as described utilized active LOW signals to generate a set of acknowledge signals. A circuit making use of active HIGH signals could easily be designed by interchanging OR and AND functions.

These and other variations, changes, substitutions and equivalents will be readily apparent to those skilled in the art without departing from the spirit and scope of the present invention. Accordingly, it is intended that the invention to be secured by Letters Patent be limited only by the scope of the appended claims.

What is claimed is:

1. In a computer system including a plurality of devices coupled for access to a shared facility, wherein each of said devices has a unique priority level associated therewith, said priority levels being expressed in three-bit octal format, apparatus for arbitrating between two or more of said plurality of devices requesting access to said shared facility, the apparatus comprising:

first means for determining the priority level of the highest priority device requesting access to said shared facility and generating an output equivalent to the priority level of the highest priority device requesting access to said shared facility; and second means for comparing the output of said first means to the priority levels of each one of said plurality of devices and generating an acknowledge signal for informing the device having a priority level equal to the output of said first means that it is permitted to access said shared facility.

said first means comprising:

a first group of 1-to-8 decoders, each one of said decoders being associated with a corresponding one of said plurality of devices, each one of said decoders having inputs connected to receive the octal formatted priority level associated with its corresponding device, an enable input connected to receive a request signal from its corresponding device and a plurality of outputs, each one of said plurality of outputs corresponding to a different priority level;

means for combining the equivalent level outputs of said plurality of decoders; and a prioritizer circuit connected to receive the combined equivalent level outputs of said plurality of decoders and generate an output equivalent to the highest received combined equivalent level output.

2. The apparatus according to claim 1, wherein:

the outputs of said plurality of decoders are normally at a HIGH level;

each one of said decoders is responsive to a request signal received at its enable input to set the decoder output corresponding to the octal formatted priority level received at its inputs to a LOW level; and said means for combining equivalent outputs comprises a plurality of AND gates, each one of said plurality of AND gates being connected to receive a different group of equivalent priority level outputs from said plurality of decoders.

3. The apparatus according to claim 2, wherein:

said prioritizer circuit generates a plurality of outputs, each one of said prioritizer outputs corresponding to a different one of said priority levels; and said prioritizer circuit is responsive to the outputs of said AND gates to set the prioritizer output corresponding to the priority level associated with the requesting device having the highest priority level to a LOW level and all other prioritizer circuit outputs to a HIGH level.

4. The apparatus according to claim 3, wherein said second means comprises:

a second group of 1-of-8 decoders, each one of said second group of decoders being associated with a corresponding one of said plurality of devices, each one of said second group of decoders having inputs connected to receive the octal formatted priority level associated with its corresponding device and a plurality of outputs, each one of said plurality of outputs corresponding to a different priority level, wherein:

the outputs of said second group of decoders are normally at a HIGH level; and each one of said second group of decoders is responsive to a request signal received at its enable input to set the decoder output corresponding to the octal formatted priority level received at its inputs to a LOW level;

first through eighth OR gates associated with each of said second group of decoders, each of said OR gates being connected to receive a corresponding output from its associated decoder and the corresponding output of said prioritizer circuit; and an AND gate associated with each of said second group of decoders for generating an acknowledge signal, each of said last-recited AND gates being connected to receive the outputs of the eight OR gates connected to its associated decoder.

5. An arbitration system for avoiding contention between up to eight devices having access to a shared facility, the system comprising:

means for storing an octal formatted priority level for each one of said device, said octal formatted priority levels having a value from 0 to 7, whereby no two of said plurality of devices have the same priority level assigned thereto;

a first group of 1-to-8 decoders, each one of said first group of decoders being associated with a corresponding one of said devices, each one of said decoders having inputs connected to said storage means for receiving the octal formatted priority level associated with its corresponding device, an enable input connected to receive a request signal from its corresponding device and first through eighth outputs, each one of said decoders being responsive to a request signal received at its enable input to set the decoder output corresponding to the octal signal received at its inputs to a LOW level, said outputs normally being at a HIGH level;

first through eighth AND gates, each one of said first through eighth AND gates being connected to receive the correspondingly identified outputs of each one of said first group of decoders;

a prioritizer circuit connected to receive the outputs of said first through eighth AND gates for generating first through eighth outputs, each one of said prioritizer outputs corresponding to a different one of said priority levels, said prioritizer circuit being responsive to the outputs of said AND gates to set the prioritizer output corresponding to the priority level associated with the requesting device having the highest priority level to a LOW level and all other prioritizer circuit outputs to a HIGH level;

a second group of 1-to-8 decoders, each one of said second group of decoders being associated with a corresponding one of said devices, each one of said second group of decoders having inputs connected to receive the octal formatted priority level associated with its corresponding device and first through eighth outputs, each one of said second group of decoders operating to set the decoder output corresponding to the octal formatted priority level received at its inputs to a LOW level, said last-recited outputs normally being at a HIGH level;

a plurality of OR gates associated with each one of said second group of decoders, each of said plurality of OR gates including first through eighth, each one of said first through eighth OR gates being connected to receive a corresponding output from its associated decoder and the corresponding output of said prioritizer circuit; and an AND gate associated with each one of said plurality of OR gates, each one of said last-recited AND gates being connected to receive the outputs of its associated plurality of OR gates for combining said received outputs to generate an acknowledge signal.

6. The arbitration circuit of claim 5, wherein:

said arbitration circuit arbitrates between seven devices having access to said shared facility;

said first group of decoders consists of seven decoders; and said second group of decoders consists of seven decoders.

* * * * *